(12) United States Patent
Spottiswoode et al.

(10) Patent No.: US 8,750,488 B2
(45) Date of Patent: *Jun. 10, 2014

(54) PREDICTED CALL TIME AS ROUTING VARIABLE IN A CALL ROUTING CENTER SYSTEM

(75) Inventors: S. James P. Spottiswoode, Beverly Hills, CA (US); Zia Chishti, Washington, DC (US)

(73) Assignee: Satmap International Holdings Limited, Hamilton (BM)

( * ) Notice: Subject to any disclaimer, the term of this patent is extended or adjusted under 35 U.S.C. 154(b) by 108 days.

This patent is subject to a terminal disclaimer.

(21) Appl. No.: 13/221,692

(22) Filed: Aug. 30, 2011

(65) Prior Publication Data

US 2012/0224680 A1 Sep. 6, 2012

Related U.S. Application Data

(60) Provisional application No. 61/378,845, filed on Aug. 31, 2010.

(51) Int. Cl.
*H04M 3/00* (2006.01)
(52) U.S. Cl.
USPC ............. 379/265.12; 379/265.01; 379/265.11
(58) Field of Classification Search
USPC ................ 379/265.01–265.14, 266.01–266.1
See application file for complete search history.

(56) References Cited

U.S. PATENT DOCUMENTS

| | | | |
|---|---|---|---|
| 5,155,763 A | 10/1992 | Bigus et al. | |
| 5,206,903 A | 4/1993 | Kohler et al. | |
| 5,702,253 A | 12/1997 | Bryce et al. | |
| 5,825,869 A | 10/1998 | Brooks et al. | |
| 5,926,538 A | 7/1999 | Deryugin et al. | |
| 6,052,460 A | 4/2000 | Fisher et al. | |
| 6,064,731 A | 5/2000 | Flockhart et al. | |
| 6,163,607 A | 12/2000 | Bogart et al. | |
| 6,222,919 B1 | 4/2001 | Hollatz et al. | |
| 6,292,555 B1 | 9/2001 | Okamoto | |
| 6,324,282 B1 | 11/2001 | McIllwaine et al. | |

(Continued)

FOREIGN PATENT DOCUMENTS

| | | |
|---|---|---|
| EP | 0 493 292 A2 | 7/1992 |
| EP | 0 949 793 A1 | 10/1999 |

(Continued)

OTHER PUBLICATIONS

U.S. Appl. No. 13/715,765, filed Dec. 14, 2012, Zia Chishti et al.

(Continued)

*Primary Examiner* — William Deane, Jr.
(74) *Attorney, Agent, or Firm* — Foley & Lardner LLP

(57) ABSTRACT

Systems and processes are disclosed for routing callers to agents in a contact center based on predicted call handle times. An exemplary process includes using predicted call handle time as a variable for call routing along with a performance matching and/or psychodemograhpic matching process of caller-agent pairs to maximize sales, customer satisfaction, and so on. The process may allocate the highest performing agents and/or the most "demographic matchable" agents to those callers that are predicted have the shortest duration. The process may further allocate the lowest performing agents and or the least "demographic matchable" agents to those callers that are predicted have the longest duration, or may not allocate the lowest performing agents to any callers at all.

15 Claims, 8 Drawing Sheets

(56) References Cited

U.S. PATENT DOCUMENTS

| | | | |
|---|---|---|---|
| 6,333,979 B1 | 12/2001 | Bondi et al. | |
| 6,389,132 B1* | 5/2002 | Price | 379/265.01 |
| 6,389,400 B1 | 5/2002 | Bushey et al. | |
| 6,408,066 B1 | 6/2002 | Andruska et al. | |
| 6,411,687 B1 | 6/2002 | Bohacek et al. | |
| 6,424,709 B1 | 7/2002 | Doyle et al. | |
| 6,434,230 B1 | 8/2002 | Gabriel | |
| 6,496,580 B1 | 12/2002 | Chack | |
| 6,504,920 B1 | 1/2003 | Okon et al. | |
| 6,519,335 B1 | 2/2003 | Bushnell | |
| 6,639,976 B1 | 10/2003 | Shellum et al. | |
| 6,661,889 B1 | 12/2003 | Flockhart et al. | |
| 6,704,410 B1* | 3/2004 | McFarlane et al. | 379/265.05 |
| 6,714,643 B1 | 3/2004 | Gargeya et al. | |
| 6,763,104 B1 | 7/2004 | Judkins et al. | |
| 6,774,932 B1 | 8/2004 | Ewing et al. | |
| 6,775,378 B1 | 8/2004 | Villena et al. | |
| 6,798,876 B1* | 9/2004 | Bala | 379/265.12 |
| 6,829,348 B1 | 12/2004 | Schroeder et al. | |
| 6,832,203 B1 | 12/2004 | Villena et al. | |
| 6,859,529 B2 | 2/2005 | Duncan et al. | |
| 6,956,941 B1 | 10/2005 | Duncan et al. | |
| 6,970,821 B1 | 11/2005 | Shambaugh et al. | |
| 6,978,006 B1 | 12/2005 | Polcyn | |
| 7,023,979 B1 | 4/2006 | Wu et al. | |
| 7,039,166 B1 | 5/2006 | Peterson et al. | |
| 7,050,566 B2 | 5/2006 | Becerra et al. | |
| 7,050,567 B1 | 5/2006 | Jensen | |
| 7,062,031 B2 | 6/2006 | Becerra et al. | |
| 7,092,509 B1 | 8/2006 | Mears et al. | |
| 7,103,172 B2 | 9/2006 | Brown et al. | |
| 7,209,549 B2 | 4/2007 | Reynolds et al. | |
| 7,231,032 B2 | 6/2007 | Nevman et al. | |
| 7,236,584 B2 | 6/2007 | Torba | |
| 7,245,716 B2 | 7/2007 | Brown et al. | |
| 7,245,719 B2 | 7/2007 | Kawada et al. | |
| 7,266,251 B2 | 9/2007 | Rowe | |
| 7,269,253 B1 | 9/2007 | Wu et al. | |
| 7,398,224 B2 | 7/2008 | Cooper | |
| 7,593,521 B2 | 9/2009 | Becerra et al. | |
| 7,676,034 B1 | 3/2010 | Wu et al. | |
| 7,725,339 B1 | 5/2010 | Aykin | |
| 7,734,032 B1 | 6/2010 | Kiefhaber et al. | |
| 7,826,597 B2 | 11/2010 | Berner et al. | |
| 7,864,944 B2 | 1/2011 | Khouri et al. | |
| 7,899,177 B1 | 3/2011 | Bruening et al. | |
| 7,916,858 B1 | 3/2011 | Heller et al. | |
| 7,940,917 B2 | 5/2011 | Lauridsen et al. | |
| 7,961,866 B1 | 6/2011 | Boutcher et al. | |
| 7,995,717 B2 | 8/2011 | Conway et al. | |
| 8,000,989 B1 | 8/2011 | Kiefhaber et al. | |
| 8,010,607 B2 | 8/2011 | McCormack et al. | |
| 8,094,790 B2 | 1/2012 | Conway et al. | |
| 8,126,133 B1 | 2/2012 | Everingham et al. | |
| 8,140,441 B2 | 3/2012 | Cases et al. | |
| 8,175,253 B2 | 5/2012 | Knott et al. | |
| 8,229,102 B2 | 7/2012 | Knott et al. | |
| 8,295,471 B2 | 10/2012 | Spottiswoode et al. | |
| 8,300,798 B1 | 10/2012 | Wu et al. | |
| 8,359,219 B2* | 1/2013 | Chishti et al. | 705/7.13 |
| 8,433,597 B2* | 4/2013 | Chishti et al. | 705/7.13 |
| 2002/0018554 A1 | 2/2002 | Jensen et al. | |
| 2002/0046030 A1 | 4/2002 | Haritsa et al. | |
| 2002/0082736 A1 | 6/2002 | Lech et al. | |
| 2002/0110234 A1 | 8/2002 | Walker et al. | |
| 2002/0111172 A1* | 8/2002 | DeWolf et al. | 455/456 |
| 2002/0138285 A1 | 9/2002 | DeCotiis et al. | |
| 2002/0143599 A1 | 10/2002 | Nourbakhsh et al. | |
| 2002/0161765 A1 | 10/2002 | Kundrot et al. | |
| 2003/0002653 A1 | 1/2003 | Uckun | |
| 2003/0081757 A1 | 5/2003 | Mengshoel et al. | |
| 2003/0095652 A1 | 5/2003 | Mengshoel et al. | |
| 2003/0169870 A1 | 9/2003 | Stanford | |
| 2003/0174830 A1 | 9/2003 | Boyer et al. | |
| 2003/0217016 A1* | 11/2003 | Pericle | 705/400 |
| 2004/0028211 A1 | 2/2004 | Culp et al. | |
| 2004/0057416 A1 | 3/2004 | McCormack | |
| 2004/0096050 A1 | 5/2004 | Das et al. | |
| 2004/0101127 A1 | 5/2004 | Dezonno et al. | |
| 2004/0109555 A1 | 6/2004 | Williams | |
| 2004/0133434 A1 | 7/2004 | Szlam et al. | |
| 2004/0210475 A1* | 10/2004 | Starnes et al. | 705/11 |
| 2004/0230438 A1 | 11/2004 | Pasquale et al. | |
| 2004/0267816 A1* | 12/2004 | Russek | 707/104.1 |
| 2005/0043986 A1 | 2/2005 | McConnell et al. | |
| 2005/0129212 A1 | 6/2005 | Parker | |
| 2005/0135596 A1 | 6/2005 | Zhao | |
| 2005/0187802 A1 | 8/2005 | Koeppel | |
| 2005/0195960 A1 | 9/2005 | Shaffer et al. | |
| 2005/0286709 A1 | 12/2005 | Horton et al. | |
| 2006/0098803 A1 | 5/2006 | Bushey et al. | |
| 2006/0110052 A1 | 5/2006 | Finlayson | |
| 2006/0124113 A1 | 6/2006 | Roberts | |
| 2006/0184040 A1 | 8/2006 | Keller et al. | |
| 2006/0222164 A1 | 10/2006 | Contractor et al. | |
| 2006/0262918 A1 | 11/2006 | Karnalkar et al. | |
| 2006/0262922 A1 | 11/2006 | Margulies et al. | |
| 2007/0036323 A1 | 2/2007 | Travis | |
| 2007/0071222 A1 | 3/2007 | Flockhart et al. | |
| 2007/0121602 A1 | 5/2007 | Sin et al. | |
| 2007/0121829 A1 | 5/2007 | Tal et al. | |
| 2007/0154007 A1 | 7/2007 | Bernhard | |
| 2007/0198322 A1 | 8/2007 | Bourne et al. | |
| 2007/0274502 A1 | 11/2007 | Brown | |
| 2008/0002823 A1 | 1/2008 | Fama et al. | |
| 2008/0008309 A1* | 1/2008 | Dezonno et al. | 379/265.02 |
| 2008/0046386 A1 | 2/2008 | Pieraccinii et al. | |
| 2008/0065476 A1* | 3/2008 | Klein et al. | 705/14 |
| 2008/0152122 A1 | 6/2008 | Idan et al. | |
| 2008/0181389 A1 | 7/2008 | Bourne et al. | |
| 2008/0199000 A1* | 8/2008 | Su et al. | 379/265.06 |
| 2008/0267386 A1 | 10/2008 | Cooper | |
| 2008/0273687 A1 | 11/2008 | Knott et al. | |
| 2009/0043670 A1 | 2/2009 | Johansson et al. | |
| 2009/0086933 A1 | 4/2009 | Patel et al. | |
| 2009/0190740 A1 | 7/2009 | Chishti et al. | |
| 2009/0190743 A1 | 7/2009 | Spottiswoode | |
| 2009/0190744 A1 | 7/2009 | Xie et al. | |
| 2009/0190745 A1 | 7/2009 | Xie et al. | |
| 2009/0190746 A1 | 7/2009 | Chishti et al. | |
| 2009/0190747 A1 | 7/2009 | Spottiswoode | |
| 2009/0190748 A1 | 7/2009 | Chishti et al. | |
| 2009/0190749 A1 | 7/2009 | Xie et al. | |
| 2009/0190750 A1 | 7/2009 | Xie et al. | |
| 2009/0232294 A1 | 9/2009 | Xie et al. | |
| 2009/0234710 A1 | 9/2009 | Belgaied Hassine | |
| 2009/0304172 A1 | 12/2009 | Becerra et al. | |
| 2009/0318111 A1 | 12/2009 | Desai et al. | |
| 2009/0323921 A1 | 12/2009 | Spottiswoode et al. | |
| 2010/0020959 A1 | 1/2010 | Spottiswoode | |
| 2010/0020961 A1 | 1/2010 | Spottiswoode | |
| 2010/0054452 A1 | 3/2010 | Afzal | |
| 2010/0054453 A1 | 3/2010 | Stewart | |
| 2010/0111285 A1 | 5/2010 | Chishti | |
| 2010/0111286 A1 | 5/2010 | Chishti | |
| 2010/0111287 A1 | 5/2010 | Xie et al. | |
| 2010/0111288 A1 | 5/2010 | Afzal et al. | |
| 2010/0142698 A1 | 6/2010 | Spottiswoode et al. | |
| 2010/0183138 A1 | 7/2010 | Spottiswoode et al. | |
| 2011/0022357 A1 | 1/2011 | Vock et al. | |
| 2011/0031112 A1 | 2/2011 | Birang et al. | |
| 2011/0069821 A1 | 3/2011 | Korolev et al. | |
| 2011/0125048 A1 | 5/2011 | Causevic et al. | |
| 2012/0051536 A1 | 3/2012 | Chishti et al. | |
| 2012/0051537 A1 | 3/2012 | Chishti et al. | |
| 2012/0278136 A1 | 11/2012 | Flockhart et al. | |

FOREIGN PATENT DOCUMENTS

| | | |
|---|---|---|
| EP | 1 032 188 A1 | 8/2000 |
| JP | 11-098252 | 4/1999 |
| JP | 2000-078292 | 3/2000 |
| JP | 2000-092213 | 3/2000 |
| JP | 2000-236393 | 8/2000 |

(56) References Cited

FOREIGN PATENT DOCUMENTS

| JP | 2001-292236 | 10/2001 |
|---|---|---|
| JP | 2003-187061 | 7/2003 |
| WO | WO-01/63894 | 8/2001 |
| WO | WO-2006/124113 A2 | 11/2006 |
| WO | WO-2010/053701 A2 | 5/2010 |
| WO | WO-2011/081514 | 7/2011 |

OTHER PUBLICATIONS

U.S. Appl. No. 13/843,541, filed Mar. 15, 2013, Zia Chisti et al.
U.S. Appl. No. 13/843,724, filed Mar. 15, 2013, Spottiswoode et al.
U.S. Appl. No. 13/843,807, filed Mar. 15, 2013, Spottiswoode et al.
U.S. Appl. No. 13/854,825, filed Apr. 1, 2013, Zia Chisti et al.
Anonymous. (2006). "Performance Based Routing in Profit Call Centers," the Decision Makers' Direct, located at www.decisioncraft.com, Issue Dec. 6, 2001, three pages.
Gans, N. et al. (2003). "Telephone Call Centers: Tutorial, Review and Research Prospects," Manuscript, pp. 1-81.
International Search Report dated Jun. 14, 2013 issued in connection with PCT/US2013/033261.
International Search Report dated May 31, 2013 issued in connection with International Application No. PCT/US 13/33268.
International Search Report mailed Jul. 6, 2010 issued in connection with PCT/US2009/061537.
International Search Report mailed Jul. 9, 2013 issued in connection with PCT/US2013/33265.
International Search Report mailed on Feb. 24, 2010, for PCT Application No. PCT/US2009/066254, filed on Dec. 1, 2009, 4 pages.
International Search Report mailed on Jun. 3, 2009, for PCT Application No. PCT/US2009/031611, filed on Jan. 21, 2009, 5 pages.
International Search Report mailed on Mar. 12, 2010, for PCT Application No. PCT/US2009/054352, filed on Aug. 19, 2009, 5 pages.
International Search Report mailed on Mar. 13, 2009, for PCT Application No. PCT/US2008/077042, filed on Sep. 19, 2008, 2 pages.
Koole, G. (2004). "Performance Analysis and Optimization in Customer Contact Centers," Proceedings of the Quantitative Evaluation of Systems, First International Conference, Sep. 27-30, 2004, four pages.
Koole, G. et al. (Mar. 6, 2006). "An Overview of Routing and Staffing Algorithms in Multi-Skill Customer Contact Centers," Manuscript, 42 pages.
Notice of Allowance dated Jun. 29, 2012 issued in connection with U.S. Appl. No. 12/355,618.
Notice of Allowance dated Sep. 19, 2012 issued in connection with U.S. Appl. No. 12/180,382.
Notice of Allowance dated Feb. 28, 2013 issued in connection with U.S. Appl. No. 12/331,201.
Notice of Allowance dated Apr. 11, 2013 issued in connection with U.S. Appl. No. 12/869,654.
Notice of Allowance dated Apr. 10, 2013 issued in connection with U.S. Appl. No. 12/266,461.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Ntzoufras, "Bayesian Modeling Using Winbugs". Wiley Interscience, Oct. 18, 2007.
Office Action dated Jan. 19, 2012 issued in connection with U.S. Appl. No. 12/266,415.
Office Action dated Jan. 23, 2012 issued in connection with U.S. Appl. No. 12/331,186.
Office Action dated Feb. 3, 2012 issued in connection with U.S. Appl. No. 12/202,091.
Office Action dated Feb. 3, 2012 issued in connection with U.S. Appl. No. 12/202,097.
Office Action dated Mar. 1, 2012 issued in connection with U.S. Appl. No. 12/180,382.
Office Action dated Mar. 2, 2012 issued in connection with U.S. Appl. No. 12/267,459.
Office Action dated Mar. 15, 2012 issued in connection with U.S. Appl. No. 12/202,101.
Office Action dated Mar. 19, 2012 issued in connection with U.S. Appl. No. 12/490,949.
Office Action dated Mar. 30, 2012 issued in connection with U.S. Appl. No. 12/267,471.
Office Action dated Apr. 6, 2012 issued in connection with U.S. Appl. No. 12/021,251.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated May 11, 2012 issued in connection with U.S. Appl. No. 12/266,415.
Office Action dated May 11, 2012 issued in connection with U.S. Appl. No. 12/331,195.
Office Action dated Jun. 7, 2012 issued in connection with U.S. Appl. No. 12/331,181.
Office Action dated Jun. 7, 2012 issued in connection with U.S. Appl. No. 12/355,602.
Office Action dated Jun. 8, 2012 issued in connection with U.S. Appl. No. 12/266,446.
Office Action dated Jun. 18, 2012 issued in connection with U.S. Appl. No. 12/331,201.
Office Action dated Jun. 29, 2012 issued in connection with U.S. Appl. No. 12/331,153.
Office Action dated Aug. 4, 2011 issued in connection with U.S. Appl. No. 12/267,459.
Office Action dated Aug. 9, 2011 issued in connection with U.S. Appl. No. 12/202,101.
Office Action dated Aug. 19, 2011 issued in connection with U.S. Appl. No. 12/202,097.
Office Action dated Aug. 19, 2011 issued in connection with U.S. Appl. No. 12/331,186.
Office Action dated Aug. 23, 2011 issued in connection with U.S. Appl. No. 12/180,382.
Office Action dated Sep. 6, 2011 issued in connection with U.S. Appl. No. 12/202,091.
Office Action dated Sep. 12, 2011 issued in connection with U.S. Appl. No. 12/266,446.
Office Action dated Sep. 13, 2011 issued in connection with U.S. Appl. No. 12/331,181.
Office Action dated Sep. 15, 2011 issued in connection with U.S. Appl. No. 12/266,418.
Office Action dated Sep. 19, 2011 issued in connection with U.S. Appl. No. 12/021,251.
Office Action dated Sep. 23, 2011 issued in connection with U.S. Appl. No. 12/355,602.
Office Action dated Sep. 26, 2011 issued in connection with U.S. Appl. No. 12/331,153.
Office Action dated Sep. 26, 2011 issued in connection with U.S. Appl. No. 12/355,618.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 30, 2013 issued in connection with Chinese Application No. 20098011060.8, with English translation.
Office Action dated Jan. 31, 2013 issued in connection with U.S. Appl. No. 12/331,161.
Office Action dated Oct. 7, 2011 issued in connection with U.S. Appl. No. 12/331,195.
Office Action dated Oct. 7, 2011 issued in connection with U.S. Appl. No. 12/331,210.
Office Action dated Oct. 9, 2012 issued in connection with U.S. Appl. No. 12/202,101.
Office Action dated Oct. 11, 2012 issued in connection with U.S. Appl. No. 12/267,459.
Office Action dated Oct. 29, 2012 issued in connection with U.S. Appl. No. 12/490,949.

(56) References Cited

OTHER PUBLICATIONS

Office Action dated Nov. 1, 2012 issued in connection with Chinese Application No. 200880128336.9, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,645.
Office Action dated Dec. 31, 2012 issued in connection with U.S. Appl. No. 12/869,654.
Office Action dated Feb. 21, 2013 issued in connection with Japanese Patent Application No. 2010-544292.
Office Action dated Mar. 28, 2013 issued in connection with U.S. Appl. No. 13/221,692.
Office Action dated Jun. 27, 2013 issued in connection with U.S. Appl. No. 12/869,645.
Office Action dated Aug. 31, 2012 issued in connection with Mexican Patent Application No. MX/a/2011/004815.
Office Action dated Jan. 8, 2013 issued in connection with Australian Patent Application No. 2008349500.
Office Action dated Jan. 8, 2013 issued in connection with Australian Patent Application No. 2009209317.
Office Action dated Jun. 7, 2013 issued in connection with Japanese Patent Application No. 2010-544399.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. MX/a/2011/004815.
Office Action mailed Jul. 2, 2013 in connection with Mexican Application No. MX/a/2010/008238.
Riedmiller, M. et al. (1993). "A Direct Adaptive Method for Faster BackpropagationLearning: The RPROP Algorithm," 1993 IEEE International Conference on Neural Networks, San Francisco, CA, Mar. 28-Apr. 1, 1993, 1:586-591.
Written Opinion dated Jun. 14, 2013 issued in connection with PCT/US2013/033261.
Written Opinion dated May 31, 2013 issued in connection with International Application No. PCT/US13/33268.
Written Opinion mailed Jun. 10, 2010 issued in connection with PCT/US2009/061537.
Written Opinion mailed on Feb. 24, 2010, for PCT Application No. PCT/US2009/066254, filed on Dec. 1, 2009, 6 pages.
Written Opinion mailed on Jun. 3, 2009, for PCT Application No. PCT/US2009/031611, filed on Jan. 21, 2009, 8 pages.
Written Opinion mailed on Mar. 12, 2010, for PCT Application No. PCT/US2009/054352, filed on Aug. 19, 2009, 6 pages.
Written Opinion mailed on Mar. 13, 2009, for PCT Application No. PCT/US2008/077042, filed on Sep. 19, 2008, 6 pages.
Written Opinion of the International Searching Authority mailed Jul. 9, 2013 issued in connection with PCT/US2013/33265.
Mexican Office Action mailed Dec. 17, 2013 issued in connection with Application No. MX/a/2010/008238.
Notice of Allowance mailed Nov. 18, 2013 issued in connection with U.S. Appl. No. 13/854,825.
Notice of Allowance mailed Dec. 23, 2013 issued in connection with U.S. Appl. No. 12/869,654.
Notice of Allowance mailed Dec. 26, 2013 issued in connection with U.S. Appl. No. 12/869,645.
Notice of Allowance mailed Nov. 26, 2013 issued in connection with U.S. Appl. No. 12/331,181.
Office Action dated Nov. 5, 2013 issued in connection with U.S. Appl. No. 13/715,765.
Office Action dated Dec. 17, 2013 issued in connection with U.S. Appl. No. 12/331,195.
Office Action mailed Nov. 5, 2013 issued in connection with U.S. Appl. No. 12/267,471.
Office Action mailed Dec. 10, 2013 issued in connection with U.S. Appl. No. 14/032,657.
Office Action mailed Oct. 22, 2013 issued in connection with Japanese Application No. 2011-525099.
Notice of Allowance dated Oct. 4, 2013 issued in connection with U.S. Appl. No. 12/202,101.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Office Action dated Oct. 21, 2013 issued in connection with U.S. Appl. No. 12/331,210.
Office Action dated Jul. 5, 2013 issued in connection with Mexican Application No. MX/a/2011/002272.
Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Third Office Action dated Aug. 29, 2013 issued in connection with Chinese Application No. 2008801283369.
Notice of Allowance dated Jan. 30, 2014 issued in connection with U.S. Appl. No. 12/202,091.
Notice of Allowance dated Feb. 27, 2014 issued in connection with U.S. Appl. No. 13/715,765.
Notice of Allowance dated Mar. 18, 2014 issued in connection with U.S. Appl. No. 14/032,657.
Notice of Allowance dated Mar. 27, 2014 issued in connection with U.S. Appl. No. 12/490,949.
Notice of Final Rejection and Denial of Entry of Amendment dated Mar. 31, 2014 issued in connection with Japanese Application No. 2010-544399, with English translation.
Notice of Reasons for Rejection dated Jan. 24, 2014 issued in connection with Japanese Patent Application No. 2011-535592, with English translation.
Office Action dated Jan. 29, 2014 issued in connection with U.S. Appl. No. 14/059,248.
Office action dated Feb. 28, 2014 issued in connection with U.S. Appl. No. 12/266,446.
Office action dated Apr. 9, 2014 issued in connection with Australian application No. 2009288509.

\* cited by examiner

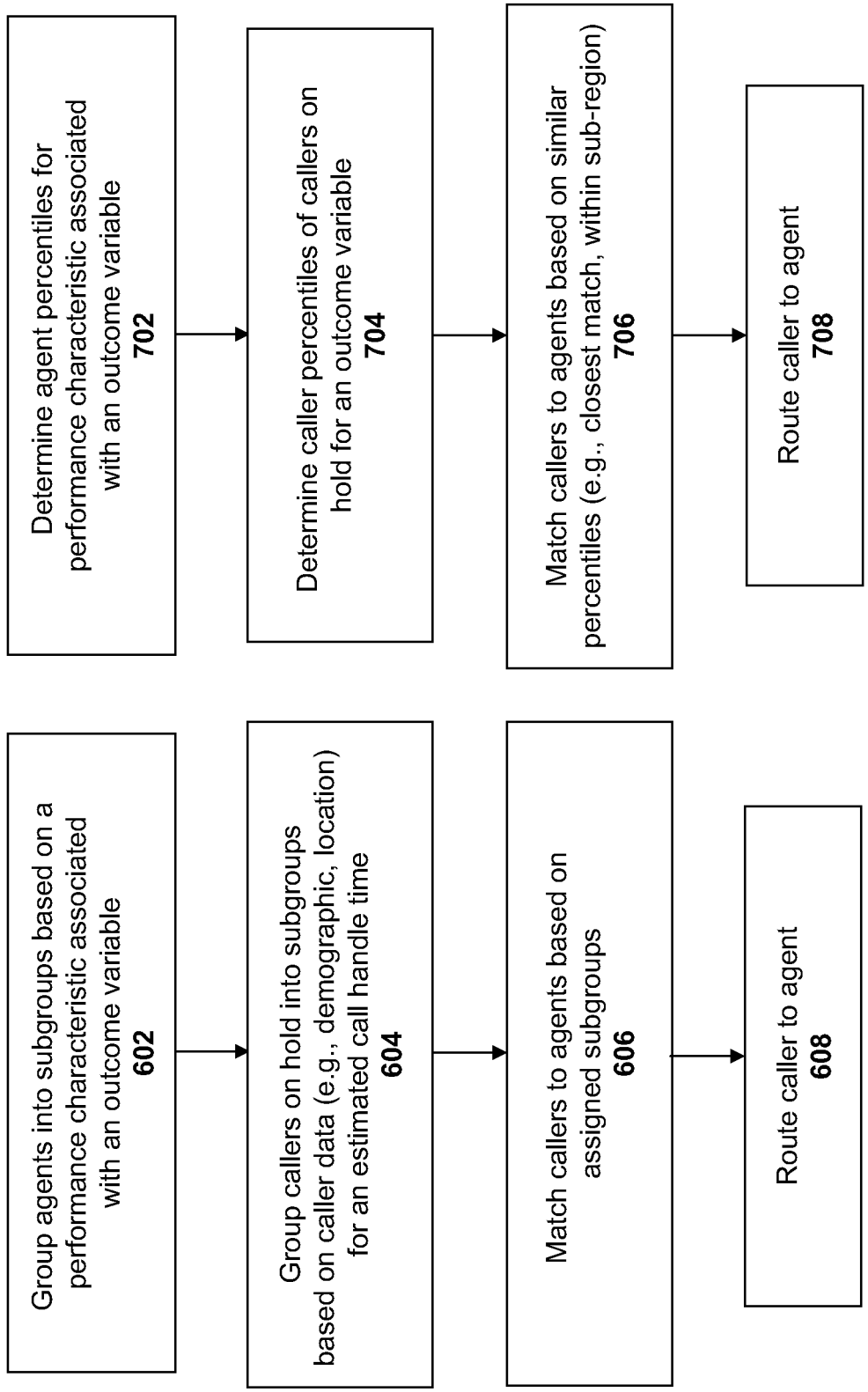

PREDICTED CALL TIME AS ROUTING VARIABLE IN A CALL ROUTING CENTER SYSTEM

CROSS-REFERENCE TO RELATED APPLICATION

This application claims priority from U.S. Provisional application No. 61/378,845, filed Aug. 31, 2010, entitled PREDICTED CALL TIME AS ROUTING VARIABLE IN A CALL ROUTING CENTER SYSTEM which is hereby incorporated by reference in its entirety and for all purposes.

BACKGROUND

1. Field

The present disclosure relates generally to the field of routing phone calls and other telecommunications in a contact center system.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals employed by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY

Systems, processes, and computer-readable storage media are provided for improving or optimizing the routing of callers to agents in a contact routing center by routing callers to agents based on a predicted or estimated call duration time for caller agent pairs. Additionally, exemplary systems, processes, and computer-readable storage media are provided for using predicted call handle times as a variable for call routing along with a performance matching and/or psychodemograhpic matching process of caller-agent pairs to maximize sales, customer satisfaction, or the like. Exemplary processes may allocate the highest performing agents and/or the most "demographic matchable" agents to those callers that are predicted have the shortest duration. The process may further allocate the lowest performing agents and/or the least "demographic matchable" agents to those callers that are predicted have the longest duration, or may not allocate the lowest performing agents to any callers at all.

Unlike typical matching algorithms that attempt to best allocate incoming calls, exemplary processes described here attempt to best allocate agent time. Using exemplary processes described, the best performing agents may receive the shortest calls, thereby giving them a larger number of calls per unit time. The middle performing agents may receive the longer calls, thereby giving them a smaller number of calls per unit time. Finally, the worst agents are given the longer calls, or possibly no calls at all, thereby giving them the smallest number of calls per unit time. The result maximizes the use of the agents by allocating a larger number of calls to the best agents. This may be advantageous as there are generally a fixed number of agents working a fixed number of hours in a typical call center.

An exemplary call routing process based on estimated call handle time includes determining an estimated call handle time for a caller and matching the caller to an agent of a set of agents based at least in part on the estimated call handle time. In one example, the call handle time may be determined based at least in part on caller data associated with the caller, e.g., demographic data, psychographic data, Billing Telephone Number (BTN) data, zip code, area code, type of phone used, and so on. The process may further include determining agent performance of a set of agents for, or associated with, an outcome variable (e.g., sales, customer satisfaction, cost, or the like). Further, the process may include matching a caller of a set of callers to an agent of the set of agents based on the agent performance and estimated call handle time of the caller; for example, matching the highest ranked agent to callers having the shortest estimated caller handle time.

In another example, the process further includes grouping the agents into agent subgroups based at least in part on the agent performance and assigning the callers to a caller subgroup based at least in part on the estimated call handle time. Callers may then be matched to an agent in an agent subgroup based on their respective caller subgroup. For example, callers from a short call subgroup may be matched to agents in a high performing subgroup. In one example, if an agent from the particular subgroup is unavailable, the caller may be placed on hold until one becomes available. In another example, the caller may be matched to a different agent subgroup after waiting a predetermined length of time.

In one example, psychodemographic data may be determined for at least a portion of the set of agents for an outcome variable. The psychodemographic data may also be used to match the caller to the agent of the set of agents. In another example, an estimated call handle time may be determined for the agent, and the agent estimated call handle time may also be used to match the caller to the agent.

In one example, determining performance of agents or caller handle time includes ranking the callers and agents for the one or more outcome variables and converting the ranking to a percentile ranking. The callers and agents can then be matched based on a closest match to the respective percentile ranking. For instance, if an agent becomes free and callers are on hold, the process may compare the agents' performance percentile ranking for sales to the caller handle time percentile ranking of all callers and match the caller having the closest corresponding percentile ranking to the agent.

The caller handle time may include a predicted value for the outcome variable based on at least one caller data. Caller data may include, for example, demographic data, psychographic, Billing Telephone Number (BTN) data, zip code, area code, type of phone used, and so on (individually or collectively referred to in this application as "caller data"), which may be used to determine a statistical or historical propensity or chance of an estimated call handle time.

The exemplary processes may further include or be supplemented by a pattern matching algorithm. For example, a pattern matching algorithm may use demographic data of the agents and/or callers to predict a chance of one or more outcome variables based on historical caller-agent pairings. The comparison via a pattern matching algorithm may be combined with the matching via corresponding agent performance and propensity of callers to determine a caller-agent match and routing decision.

Agent data may include agent grades or rankings, agent historical data, agent demographic data, agent psychographic data, and other business-relevant data about the agent (individually or collectively referred to in this application as "agent data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It is further noted that certain data, such an area code, may provide statistical data regarding probable income level, education level, ethnicity, religion, and so on, of a caller which may be used by the exemplary process to determine a propensity of caller for a particular outcome variable, for example.

Another exemplary call routing process based on estimated call handle time includes determining an estimated call handle time for at least a portion of a set of callers and matching a caller of the set of callers to an agent of a set of agents based at least in part on the estimated call handle time of the caller.

The examples can be applied broadly to different processes for matching callers and agents. For instance, exemplary processes or models may include conventional queue routing, performance based matching (e.g., ranking a set of agents based on performance and preferentially matching callers to the agents based on a performance ranking or score), an adaptive pattern matching algorithm or computer model for matching callers to agents (e.g., comparing caller data associated with a caller to agent data associated with a set of agents), affinity data matching, combinations thereof, and so on. The methods may therefore operate to output scores or rankings of the callers, agents, and/or caller-agent pairs for a desired optimization of an outcome variable (e.g., for optimizing cost, revenue, customer satisfaction, and so on). In one example, different models may be used for matching callers to agents and combined in some fashion with the exemplary multiplier processes, e.g., linearly weighted and combined for different performance outcome variables (e.g., cost, revenue, customer satisfaction, and so on).

According to another aspect, computer-readable storage media and apparatuses are provided for mapping and routing callers to agents according to the various processes described herein. Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

BRIEF DESCRIPTION OF THE DRAWINGS

FIG. 6 illustrates an exemplary probability matching process or computer model for matching callers to agents based on probabilities of outcome variables and estimated call handle times.

FIG. 7 illustrates an exemplary probability matching process or computer model for matching callers to agents based on probabilities of outcome variables.

DETAILED DESCRIPTION

Figure 1:
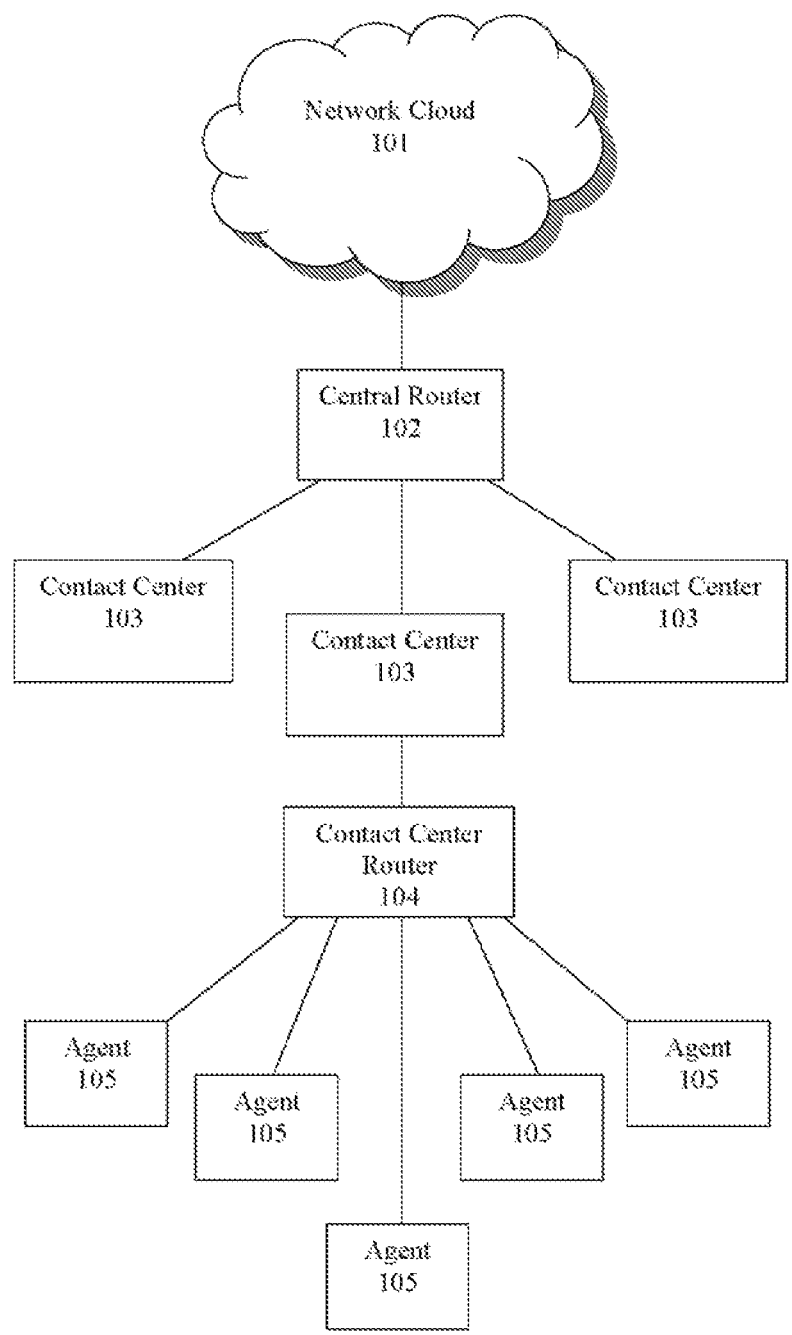
FIG. 1 is a diagram reflecting the general setup of a contact center and its operation.

The following description is presented to enable a person of ordinary skill in the art to make and use the various embodiments, and is provided in the context of particular applications and their requirements. Various modifications to the embodiments will be readily apparent to those skilled in the art, and the generic principles defined herein may be applied to other embodiments and applications without departing from the spirit and scope of the various embodiments. Moreover, in the following description, numerous details are set forth for the purpose of explanation. However, one of ordinary skill in the art will realize that the embodiments may be practiced without the use of these specific details. In other instances, well-known structures and devices are shown in block diagram form in order not to obscure the description of the embodiments with unnecessary detail. Thus, the various embodiments are not intended to be limited to the examples shown, but are to be accorded the widest scope consistent with the principles and features disclosed herein.

While the various embodiments are described in terms of particular examples and illustrative figures, those of ordinary skill in the art will recognize that the various embodiments are not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in the various embodiments.

According to certain aspects of the various embodiments, systems and methods are provided for matching callers to agents within a call routing center based on a predicted or estimated call handle time. For instance, an exemplary process includes using predicted call handle time as a variable for call routing along with a performance matching and/or psychodemograhpic matching process of caller-agent pairs to maximize sales, customer satisfaction, and so on. For example, in a sales campaign, the process may allocate the highest performing agents and/or the most "demographic matchable" agents to those callers that are predicted to have the shortest duration. Additional factors that may be used include data indicating callers that have the highest predicted potential to buy.

Initially, exemplary call routing systems and methods are described for matching callers to agents. This description is followed by exemplary systems and methods for determining a predicted or estimated call handle time for a caller, and matching agents to callers based on the predicted or estimated call handle time. For instance, callers having a short estimated call handle times maybe assigning to higher ranking agents while callers having longer estimated call handle times may be matched to lower ranking agents.

FIG. 1 is a diagram reflecting the general setup of a typical contact center operation 100. The network cloud 101 reflects a specific or regional telecommunications network designed to receive incoming callers or to support contacts made to outgoing callers. The network cloud 101 may comprise a single contact address, such as a telephone number or email address, or multiple contact addresses. The central router 102 comprises contact routing hardware and software designed to help route contacts among contact centers 103. The central router 102 may not be needed where there is only a single contact center deployed. Where multiple contact centers are deployed, more routers may be needed to route contacts to another router for a specific contact center 103. At the contact center level 103, a contact center router 104 may route a contact to an agent 105 with an individual telephone or other telecommunications equipment. Typically, there are multiple agents 105 at a contact center 103.

Figure 2:
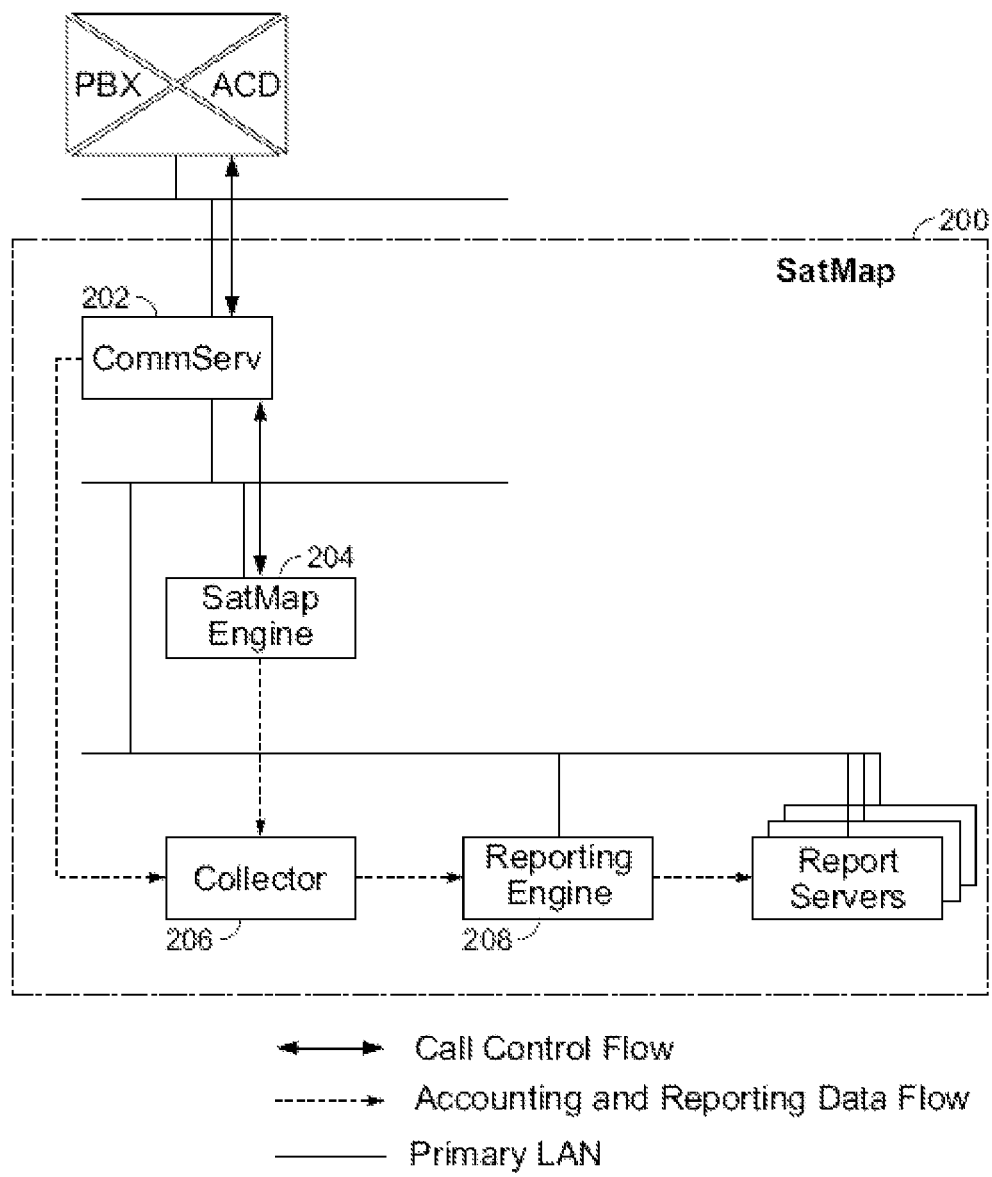
FIG. 2 illustrates an exemplary routing system having a routing engine for routing callers based on performance, estimated call handle time, and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part and in one example, on an estimated call duration time. Routing system 200 may further be operable to match callers based on agent performance or pattern matching algorithms using caller data and/or agent data alone or in combination with the probability multiplier process. Routing system 200 may include a communication server 202 and a routing engine 204 for receiving and matching callers to agents (referred to at times as "mapping" callers to agents).

In one example, and as described in greater detail below, routing engine 204 is operable to determine or retrieve performance data for available agents and caller propensity for an outcome variable from callers on hold. The performance data and caller propensity data may be converted to percentile ranks for each and used to match callers to agents based on the closest match of percentile ranks, respectively, thereby resulting in high performing agents matched to callers with a high propensity to purchase, for example.

In another example, and as described in greater detail below, routing engine 204 may be operable to determine or retrieve performance data for available agents and a predicted or estimated call handle time for a caller. The performance data and estimated call handle time may be used to group agents and callers into agent sub-groups and caller sub-groups, respectively. The callers in a particular caller sub-group may be matched to various agent sub-groups based at least in part on the caller sub-group. Thus, certain sub-groups of callers, for example, callers with short estimated call handle times, may be matched to certain sub-groups of agents, for example, high performing agents, more often than other agent sub-groups.

Additionally, in some examples, routing engine 204 may further include pattern matching algorithms and/or computer models, which may adapt over time based on the performance or outcomes of previous caller-agent matches. The additional pattern matching algorithms may be combined in various fashions with a probability multiplier process to determine a routing decision. In one example, a pattern matching algorithm may include a neural network based adaptive pattern matching engine as is known in the art; for example, a resilient backpropagation (RProp) algorithm, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. Various other exemplary agent performance and pattern matching algorithms and computer model systems and processes which may be included with contact routing system and/or routing engine 204 are described, for example, in U.S. patent application Ser. No. 12/021,251, filed Jan. 28, 2008, U.S. patent application Ser. No. 12/202,091, filed Aug. 29, 2008, and U.S. patent application Ser. No. 12/490,949, filed Jun. 24, 2009, all of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, historical performance data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
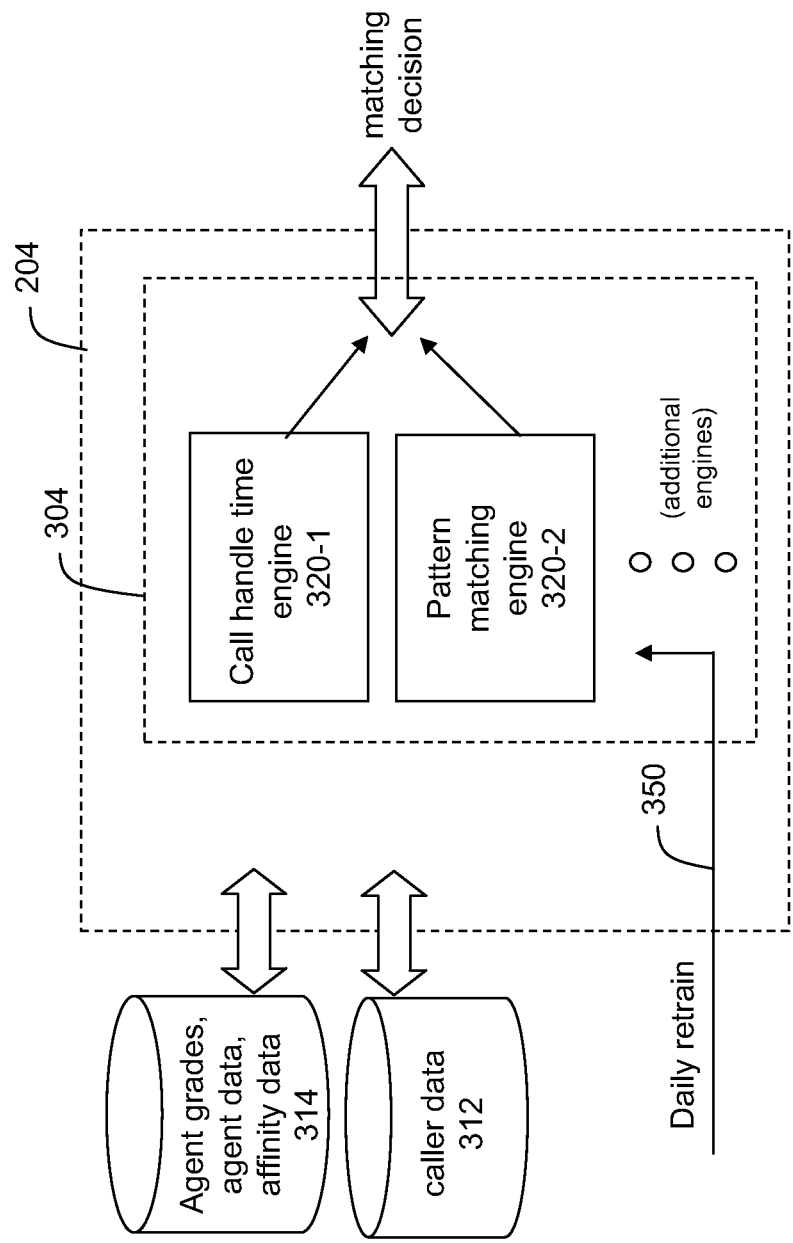
FIG. 3 illustrates an exemplary routing system having a mapping engine for matching callers to agents based on an estimated call handle time process alone or in combination with one or more additional matching processes.

FIG. 3 illustrates further detail of exemplary routing engine 204. Routing engine 204 includes a main mapping engine 304, which may include one or more mapping engines therein for use alone or in combination with other mapping engines. In some examples, routing engine 204 may route callers based solely or in part on performance data associated with agents and caller data associated with the propensity or chances of a particular outcome variable. In other examples, routing engine 204 may route callers based solely or in part on performance data associated with agents and an estimated call handle time associated with the caller. In yet other examples, routing engine 204 may further make routing decisions based solely or in part on comparing various caller data and agent data, which may include, e.g., performance based data, demographic data, psychographic data, type of phone/phone number, BTN-data, and other business-relevant data. Additionally, affinity databases (not shown) may be used and such information received by routing engine 204 and/or mapping engine 304 for making or influencing routing decisions. Database 312 may include local or remote databases, third party services, and so on (additionally, mapping engine 304 may receive agent data from database 314 if applicable for the particular mapping process).

In one example, relative agent performance may be determined by ranking or scoring a set of agents based on performance for a particular outcome variable (such as revenue generation, cost, customer satisfaction, percentage of calls ending with positive result, average call handle times, or the like). Further, the relative agent performance may be converted to a relative percentile ranking. A probability multiplier engine (not shown), for example, may determine or receive relative agent performance data for one or more outcome variables. Additionally, the probability multiplier engine may receive or determine a propensity of a caller for a particular outcome variable (such as propensity to purchase, to be satisfied, and the like). The propensity of a caller may be determined from available caller data. The relative performance data of the agents and propensity data of the callers may then be used to match a caller and an agent based on corresponding ranking. In some examples, the performance and propensity data is converted to relative percentile rankings for the callers and agents, and matching callers and agents based on the closest respective relative percentiles.

In another example, relative agent performance may be determined by ranking or scoring a set of agents based on performance for a particular outcome variable (such as revenue generation, cost, customer satisfaction, percentage of calls ending with positive result, combinations thereof, and the like). Processing engine 320-1, for example, may determine or receive relative agent performance data for one or more outcome variables. The relative agent performance may be used to group the agents into one or more sub-groups. For example, the top third of the agents may be grouped into a high performing sub-group, the second third of agents may be grouped into a middle performing sub-group, and the bottom third of agents may be grouped into a bottom performing sub-group. Additionally, processing engine 320-1 may receive or determine an estimated call handle time of a caller. The estimated call handle time may be determined based at least in part on the caller's location, gender, age, call history, socio-economic data (e.g., from census data retrieved using the caller's billing telephone number ("BTN") or NPA/NXX to determine their location from an appropriate database), time of day and/or time of year of the call, or the like. For example, older callers may on average have longer call handle times. Conversely, younger callers may on average, have shorter call handle times. In some examples, the estimated call handle time may be used to group callers into one or more sub-groups. For example, callers having estimated call times greater than a predetermined length, for example, 10 minutes, may be grouped into a long call sub-group, while callers having estimated call times shorter than the predetermined length, maybe grouped into a short call sub-group. The predetermined length may be fixed, or may change over time based on the available agents, callers waiting to speak to an agent, and the like. The grouping based on the relative performance data of the agents and estimated call handle time of the callers may then be used to match a caller and an agent. While specific numbers of sub-groups are provided above, it should be appreciated that the agents and callers may be grouped into any number of sub-groups.

In some examples, the agent sub-group that a caller is matched with may be based at least in part on the caller sub-group that the caller is assigned to. In one example, a caller determined to be in a short call sub-group may be matched with an agent in the top third sub-group (high performing sub-group). This may result in the best agents handling the shortest calls, thereby assigning the best agents the largest number of calls per unit time. If an agent from the top third sub-group is unavailable, the caller from the short call sub-group may instead be matched with an agent in the second third sub-group (middle performing sub-group). If an agent from the top third sub-group and the second third sub-group are unavailable, the caller may be matched with an agent in the bottom third sub-group (bottom performing sub-group). Additionally, a caller determined to be in a long call sub-group may be matched with an agent in the second third sub-group. If an agent from the second third sub-group is unavailable, the caller may instead be matched with an agent in the first third sub-group. If an agent from the second third sub-group and the first third sub-group are unavailable, the caller may be matched with an agent in the bottom third sub-group. This may result in the best agents handling the shortest calls, the middle performing agents handling the longer calls, and the worst agents handling the longer calls, or no calls at all. In some examples, the caller may be put on hold for up to a predetermined amount of time before matching the caller to an agent in a lower priority sub-group. For example, a caller from a long call sub-group may be required to wait 5 minutes for a middle performing agent before matching the caller to a high performing agent. In other examples, where there are no callers on hold and agents are available, the caller may be matched with the highest ranking agent. In other examples, handle time specific agent performance scores or ranks may be determined for calls having different ranges of handle time. For example, agent performance may be determined specifically for calls from customer groups with short handle times. Then, only agents with high performance with respect to calls having short handle times may be matched with callers having short handle times. Similarly, only agents with high performance with respect to calls having long handle times may be matched with callers having long handle times.

Unlike most matching algorithms that attempt to best allocate incoming calls, the process described above attempts to best allocate agent time. Using the process described above, the best agents may receive the shortest calls, thereby giving them a larger number of calls per unit time. The middle performing agents may receive the longer calls, thereby giving them a smaller number of calls per unit time. Finally, the worst agents are given the longer calls, or possibly no calls at all, thereby giving them the smallest number of calls per unit time. The result maximizes the use of the agents by allocating a larger number of calls to the best agents. This may be advantageous as there are generally a fixed number of agents working a fixed number of hours in a typical call center.

Processing engine 320-2, in one example, includes one or more pattern matching algorithms, which operate to compare available caller data with a caller to agent data associated with a set of agents and determine a suitability score of each caller-agent pair. Processing engine 320-2 may receive caller data and agent data from various databases (e.g., 312 and 314) and output caller-agent pair scores or a ranking of caller-agent pairs, for example. The pattern matching algorithm may include a correlation algorithm such as a neural network algorithm, genetic algorithm, or other adaptive algorithm(s).

Additionally, a processing engine may include one or more affinity matching algorithms, which operate to receive affinity data associated with the callers and/or agents. Affinity data and/or affinity matching algorithms may be used alone or in combination with other processes or models discussed herein.

Routing engine 204 may further include selection logic (not shown) for selecting and/or weighting one or more of the plurality of processing engines 320-1 and 320-2 for mapping a caller to an agent. For example, selection logic may include rules for determining the type and amount of caller data that is known or available and selecting an appropriate processing engine 320-1, 320-2, etc., or combinations thereof. Selection logic may be included in whole or in part with routing engine 204, mapping engine 304, or remotely to both.

Further, as indicated in FIG. 3 at 350, call history data (including, e.g., caller-agent pair data and outcomes with respect to cost, revenue, customer satisfaction, call duration, and so on) may be used to retrain or modify processing engines 320-1 and 320-2. For instance, the agent performance data may be updated periodically (e.g., daily) based on historical outcomes to re-rank the agents. Further, historical information regarding callers may be used to update information regarding caller propensities for particular outcome variables.

In some examples, routing engine 204 or main mapping engine 304 may further include a conventional queue based routing processes, which may store or access hold or idle times of callers and agents, and operate to map callers to agents based on a hold time or queue order of the callers (and/or agents). Further, various function or time limits may be applied to callers on hold to ensure that callers are not held too long awaiting an agent. For instance, if a caller's time limit (whether based on a predetermined value or function related to the caller) is exceeded the caller can be routed to the next available agent.

Additionally, an interface may be presented to a user allowing for adjustment of various aspects of the exemplary systems and methods, for example, allowing adjustments of the number of different models, degrees, and types of caller data. Further, an interface may allow for the adjustment of the particular models used for different degrees or types, for example, adjusting an optimization or weighting of a particular model, changing a model for a particular degree or type of caller data, and so on. The interface may include a slider or selector for adjusting different factors in real-time or at a predetermined time. Additionally, the interface may allow a user to turn certain methods on and off, and may display an estimated effect of changes. For instance, an interface may display the probable change in one or more of cost, revenue generation, or customer satisfaction by changing aspects of the routing system. Various estimation methods and algorithms for estimating outcome variables are described, for example, in copending U.S. provisional Patent application Ser. No. 61/084,201, filed on Jul. 28, 2008, and which is incorporated herein by reference in its entirety. In one example, the estimate includes evaluating a past time period of the same (or similar) set of agents and constructing a distribution of agent/caller pairs. Using each pair, an expected success rate can be computed via the performance based matching, pattern matching algorithm, etc., and applied to current information to estimate current performance (e.g., with respect to one or more of sales, cost, customer satisfaction, etc.). Accordingly, taking historical call data and agent information the system can compute estimates of changing the balance or weighting of the processing methods. It is noted that a comparable time (e.g., time of day, day of the week etc.) for the historical information may be important as performance will likely vary with time.

Figure 4B:
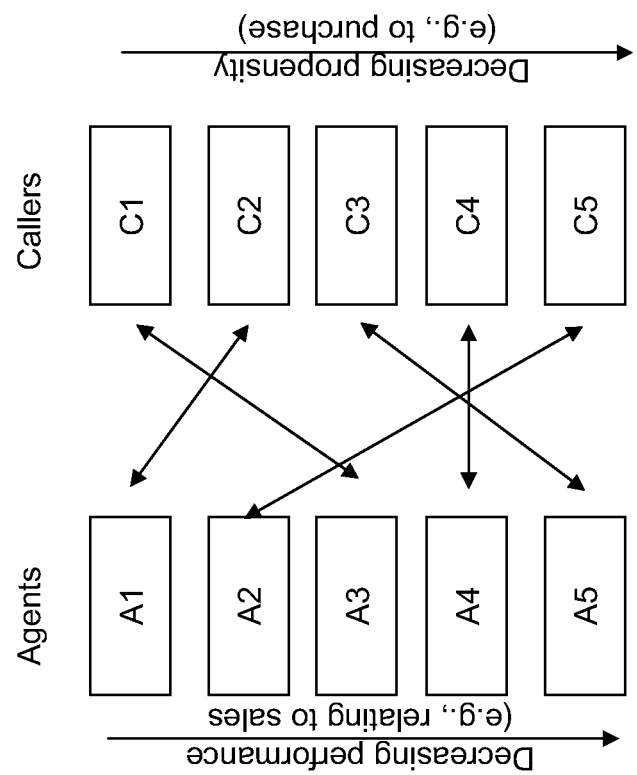
FIGS. 4A and 4B illustrate an exemplary probability matching process and random matching process, respectively.
Figure 4A:
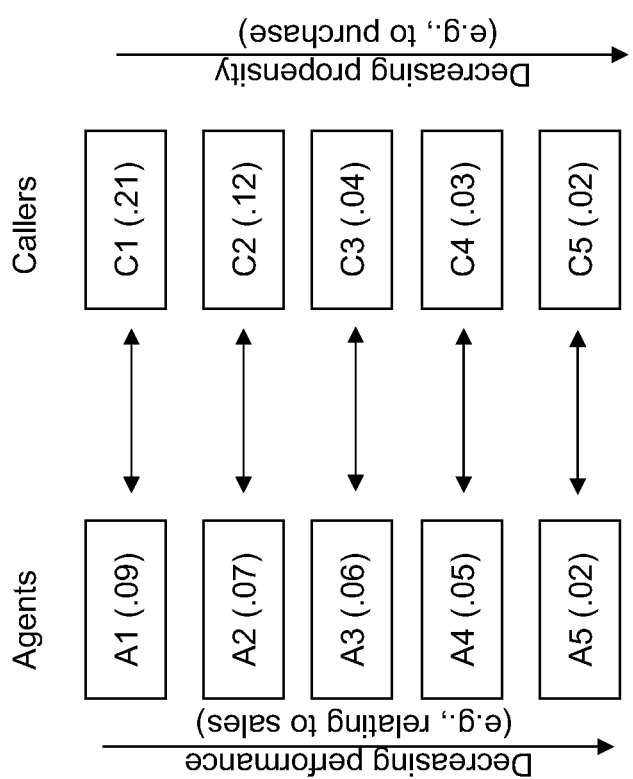

FIG. 4A schematically illustrates an exemplary probability multiplier process for matching callers and agents and FIG. 4B illustrates a random matching process (e.g., queue based or the like). These illustrative examples assume that there are five agents and five callers to be matched. The agents can be ranked based on performance of a desired outcome variable. For instance, the agents may be scored and ordered based on a statistical chance of completing a sale based on historical sales rate data. Additionally, the callers can be scored and ranked based on an estimated call handle time and/or a desired outcome variable, for example, on a propensity or likelihood to purchase products or services. The callers may be ranked and ordered based on known or available caller data including, for example, demographic data, zip codes, area codes, type of phone used, and so on, which are used to determine a statistical or historical chance of the caller making a purchase. In some examples, the callers may be ranked or ordered based on a received or determined estimated call handle time based on some or all of the available caller data. The caller having the shortest estimated call handle time may be considered the highest ranked caller, whereas the caller having the longest estimated call handle time may be considered the lowest ranked caller.

The agents and callers are then matched to each other based on the ranking, where the highest ranked agent is matched to the highest ranked caller, the second highest ranked agent matched to the second highest ranked caller, and so on. Matching the best to the best and worst to the worst results in an increase product of the matched pairs compared to randomly matching callers to agents as shown in FIG. 4B. For instance, using illustrative sales rates for agents A1-A5 (e.g., based on past agent performance) and the chance of callers C1-C5 making a purchase (e.g., based on caller data such as demographic data, caller data, and so on), the product of the matches shown in FIG. 4A is as follows:

$$(0.09*0.21)+(0.07*0.12)+(0.06*0.04)+(0.05*0.03)+(0.02*0.02)=0.0316$$

In contrast, for a random matching, as illustrated in FIG. 4B and using the same percentages, the product is as follows:

$$(0.09*0.12)+(0.07*0.02)+(0.06*0.21)+(0.05*0.03)+(0.02*0.04)=0.0271$$

Accordingly, matching the highest ranking agent with the highest ranking caller and the worst ranking agent with the worst ranking caller increases the overall product, and thus chances of optimizing the desired outcome variable (e.g., sales).

Figure 5B:
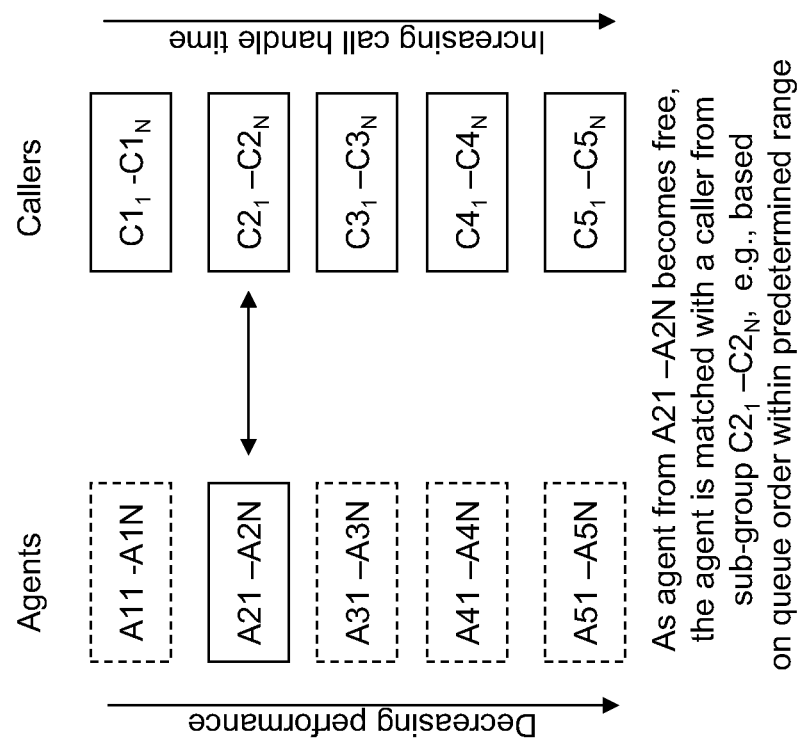
FIGS. 5A and 5B illustrate exemplary matching processes for matching a caller to an agent based on estimated call handle time.
Figure 5A:
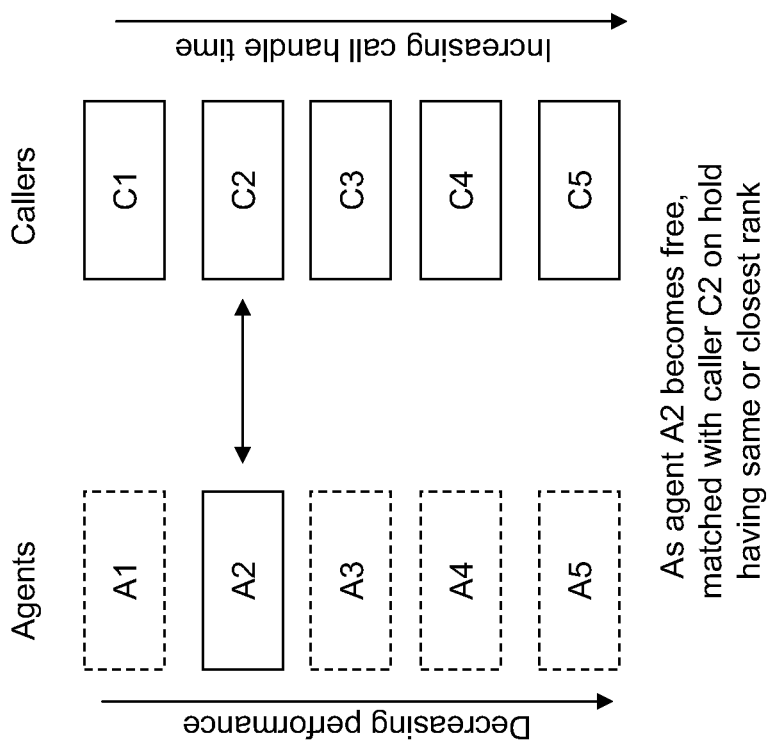

FIG. 5A schematically illustrates an exemplary process for matching callers on hold to an agent that becomes free. In this example, all agents A1-A5 on duty or all that might become free within a reasonable hold time of callers C1-C5 are scored or ranked as previously described. Additionally, callers C1-C5 are scored or ranked based at least in part on the estimated call handle time as previously described. As an agent, e.g., agent A2, becomes free the process determines that caller C2 is the same (or similar) rank as agent A2 and caller C2 is matched thereto. The remaining callers on hold may then be re-ranked for matching when the next agent becomes free. Additionally, as new callers are placed on hold the callers can be re-ranked in a real-time fashion. The exemplary process operates in a similar fashion for multiple free agents and a caller becomes free (both for inbound and outbound call centers).

It will be recognized that in most instances the number of agents and callers will not be equal. Accordingly, the callers (and/or agents) can be ranked and converted to relative percentile rankings for the callers; for example, a normalized ranking or setting the highest ranked caller as the $100^{th}$ percentile and the lowest ranked caller as the $0^{th}$ percentile. The agents may be similarly converted to relative percentile rankings. As an agent becomes free, the agent may be matched to the caller having the closest relative percentile rank to the agent's relative percentile rank. In other examples, as an agent becomes free the agent can be compared to the ranking of at least a portion of callers on hold to compute Z-scores for each agent-caller pair. The highest Z-score may correspond to the smallest difference in relative percentile rankings. Further, as noted herein, the Z-scores may be used to combine the matching with other algorithms such as pattern matching algorithms, which may also output a Z-score.

FIG. 5B schematically illustrates an exemplary process for matching callers and agents when an agent becomes free and multiple callers are on hold. In this example, the agents are grouped in sub-groups based on performance and the callers are grouped in sub-groups based on estimated call handle times, as described above. For instance, a range of estimated call handle times may be divided into multiple sub-groups and callers bucketed within each group. The top 20% of callers by estimated call handle time may be grouped together as $C1_1$-$C1_N$ as illustrated, followed by the next 20%, and so on. As an agent becomes free, e.g., an agent from $A2_1$-$A2_N$, a caller from an appropriate sub-group is matched to the caller, in this example from $C2_1$-$C2_N$. Within the sub-group the caller may be chosen by a queue order, best-match, a pattern matching algorithm, or the like. The appropriate sub-group from which to route a caller may be determined based on the agent sub-group as described above, for example. In some examples, callers may be routed to agents in other sub-groups if the caller has been waiting for longer than a predetermined amount of time. For example, if a caller from $C2_1$-$C2_N$ has been waiting for longer than 30 minutes, the caller may instead be matched with an agent from the next priority group for that caller sub-group, for example, $A1_1$-$A1_N$.

In some examples, callers from multiple sub groups, e.g., $C1_1$-$C1_N$ and $C2_1$-$C2_N$ may be routed to a single subgroup of agents, e.g., $A1_1$-$A1_N$. Additionally, particular subgroups of agents, e.g., $A5_1$-$A5_N$, may be set to receive no calls absent a caller hold time exceeding a threshold, e.g., due to agents in higher performing subgroups being unavailable.

In one example, suppose it is desired to optimize a call center performance for Outcome variable O. O can include one or more of sales rate, customer satisfaction, first call resolution, or other variables. Suppose further that at some time there are $N_A$ agents logged in and $N_C$ callers in queue. Suppose that agents have performances in generating O of $$A_i^O \ (i=1, \ldots, N_A)$$

and callers, partitioned by some property P, have a propensity to O of $$C_i^O \ (i=1, \ldots, N_C)$$

For example, in the case where O is sales rate and P is caller area code, $A^O$ is each agent's sales rate and $C^O$ is the sales rate for callers in a particular area code. Calculating the percentile ranked agent performances (with respect to the set of logged in agents) and the percentile ranked caller propensities (with respect to the set of callers in queue at some instant of time) as follows:

$$A_{Pi}^O = pr(A_i^O, A^O) \ (i=1, \ldots, N_A)$$

$$C_{Pi}^O = pr(C_i^O, C^O) \ (i=1, \ldots, N_C)$$

where pr(a,B) is the percentile rank function which returns the rank of value a with respect to the set of values B scaled into the range [0,100].

Suppose that all the agents are on calls when the k'th agent becomes available. Then to determine which caller in the queue they should be connected to, compute the difference between the percentile ranks of the newly free k'th agent and those of the callers in queue:

$$D_j = A_{Pk}^O - C_{Pj}^O \ (j=1, \ldots, N_C)$$

The value of j indexing the minimum element of the set $\{D_j\}$ gives the member of the queue to connect to the k'th agent. A Z-score can also be derived from the $D_j$ This has the advantages that the highest value agent-caller pairing is the best fit of the set and that the output from this algorithm can be combined with Z-score outputs from other algorithms since they have the same scale.

$$Z_j = (T_j - \mu)/\sigma$$

where $\mu$ and $\sigma$ and the mean and standard deviation of T which is given by:

$$T_j = \text{Min}(D_j) - D_j$$

It will be recognized by those of skill in the art that the above example and algorithm described for the case of two variables is not restricted to the case of two variables, but can be extended in an obvious way to the case of more than two variables which are monotonically related to the desired outcome. Furthermore the increase in call center performance can be shown to increase with more variables, as will be understood and contemplated by those of ordinary skill in the art.

FIG. 6 illustrates an exemplary process for matching callers to agents within a call routing center. In this example, agents are ranked based on a performance characteristic associated with an outcome variable such as sales or customer satisfaction at 602. In some examples agent performance may be determined for each agent from historical data over a period of time. In other examples, the method may merely retrieve or receive agent performance data or agent ranking for the agents.

In one example, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agents can be as simple as ranking each agent on a scale of 1 to N for a particular optimal interaction, with N being the total number of agents. The method of grading can also comprise determining the average contact handle time of each agent to grade the agents on cost, determining the total sales revenue or number of sales generated by each agent to grade the agents on sales, or conducting customer surveys at the end of contacts with callers to grade the agents on customer satisfaction. The grading may then be used to group the agents into subgroups, for example, as described above with respect to FIGS. 2, 3, and 5B. The foregoing, however, are only examples of how agents may be graded; many other methods may be used.

Callers are ranked or scored based on an estimated call handle time based on caller data at 604. Callers may be ranked or scored based on the estimated call handle time based on known or available caller data. The amount and type of caller data may vary for each caller but can be used to determine an estimated call handle time. For instance, the only data known for a caller might be an area code, which is associated with a particular call handle time based on past interactions with callers from the particular area code. Additionally, or alternatively, the area code may be associated with a particular demographic, for example, a particular area code may be associated with an older population, which generally results in longer call handle times. Other types of caller data may be used to determine an estimated call handle time, for example, age, gender, location, prior call history, socio-economic data (e.g., from census data retrieved using the caller's billing telephone number ("BTN") or NPA/NXX to determine their location from an appropriate database), time of day and/or time of year of the call, and the like. In some examples, there may be no data associated with the caller, in which case an average call handle time may be used when no caller data is available. The rank or score may then be used to group the callers into subgroups, for example, as described above with respect to FIGS. 2, 3, and 5B.

Callers and agents are then matched based on their respective subgroups at 606. For example, matching the better agents to the callers having shorter estimated call handle times, and so on as described. The process may then route, or cause the routing, of the caller to the agent at 608. In other examples, the process may pass the match on to other apparatuses or processes that may use the match in other processes or use to weight with other routing processes.

FIG. 7 illustrates another exemplary process for matching callers to agents within a call routing center. In this example, agents are ranked based on a performance characteristic associated with an outcome variable such as sales or customer satisfaction and converted to a relative percentile ranking at 702. For example, the raw performance values of the agents can be converted into a relative percentile ranking; for example, a 9% sales rate might be converted to an 85% performance ranking In other examples, the raw performance values can be converted to a standardized score or Z-score.

Callers are ranked or scored based on an outcome variable based on caller data and converted to a relative percentile ranking at 704. Similar to that of the agents, raw predicted values for the callers can be converted into a percentile ranking; for example, a 20% propensity or likelihood to purchase might be converted to a 92% percentile ranking amongst callers. In other examples, the raw values can be converted to a standardized score or Z-score.

Callers and agents are then matched based on their respective relative percentile rankings at 706. For example, the relative percentile ranking of a caller can be compared to relative percentile ranking of agents and the caller matched to the closest agent available. In examples where an agent becomes free and multiple callers are on hold the agent may be matched to the closest matching caller. In other examples, a caller may be held for a predetermined time for the best matching agent to become free and then matched and routed to the closest matching agent.

It will be recognized that various other fashions of ranking callers and agents, and matching callers to agents based on their respective rankings, are contemplated. For example, generally speaking, the exemplary processes result in callers having shorter estimated call handle time being routed to higher ranking agents and callers having longer estimated call handle time being routed to lower ranking agents.

Figure 8:
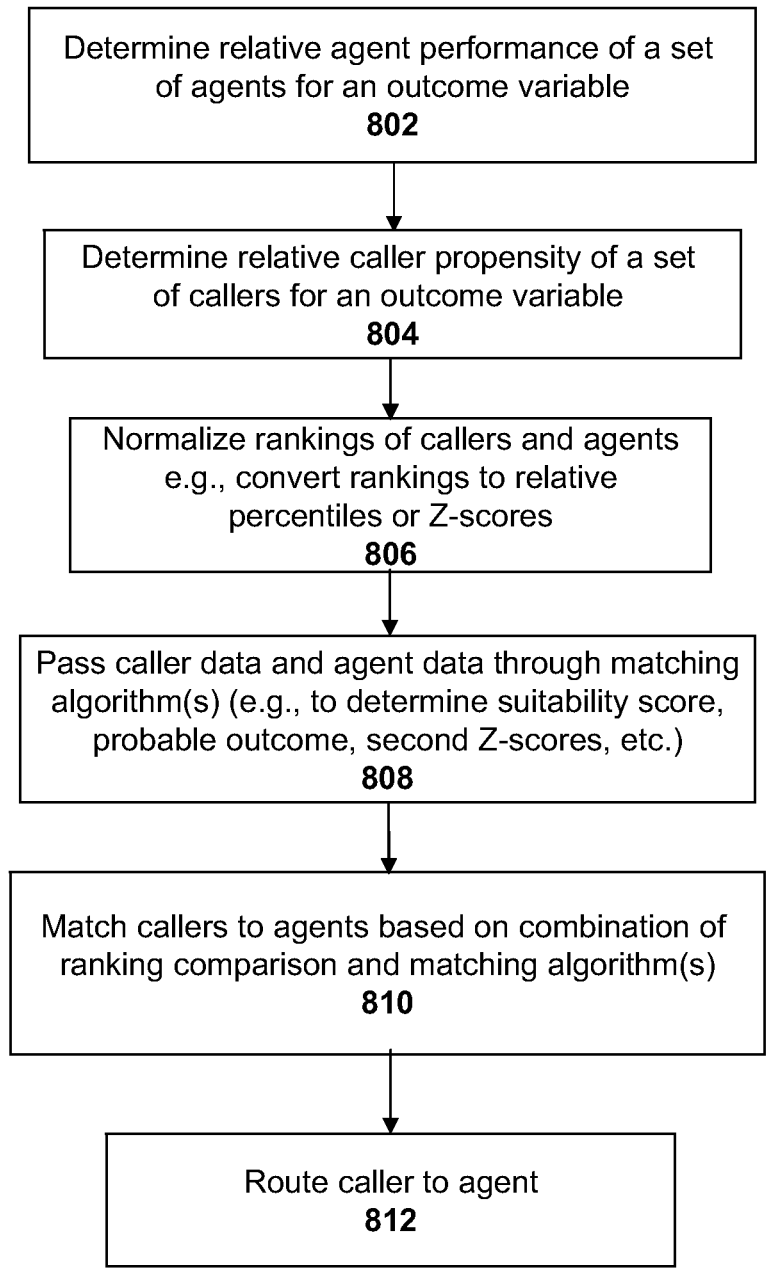
FIG. 8 illustrates an exemplary probability matching process or computer model for matching callers to agents based on probabilities of outcome variables.

FIG. 8 illustrates another exemplary process for matching callers to agents within a call routing center based on both a probability multiplier process and a pattern matching algorithm. The process includes determining relative agent performance of a set of agents for an outcome variable at 802 and determining relative caller propensity of a set of callers for the outcome variable at 804. The relative agent performance and relative caller propensity may further be normalized or converted to relative percentile rankings at 806.

A portion or all of available agent data and caller data may be passed through a pattern matching algorithm at 808. In one example, the matching algorithm includes an adaptive pattern matching algorithm such as a neural network algorithm that is trained on previous caller-agent pairing outcomes.

The matching algorithm may include comparing demographic data associated with the caller and/or agent for each caller-agent pair and computing a suitability score or ranking of caller-agent pairs for a desired outcome variable (or weighting of outcome variables). Further, a Z-score can be determined for each caller-agent pair and outcome variable(s); for instance, co-pending U.S. patent application Ser. No. 12/202,091, filed Aug. 29, 2009, describes exemplary processes for computing Z-scores for caller-agent pairs and is incorporated by reference herein in its entirety.

Exemplary pattern matching algorithms and computer models can include a correlation algorithm, such as a neural network algorithm or a genetic algorithm. In one example, a resilient backpropagation (RProp) algorithm may be used, as described by M. Riedmiller, H. Braun: "A Direct Adaptive Method for Faster backpropagation Learning: The RPROP Algorithm," Proc. of the IEEE Intl. Conf. on Neural Networks 1993, which is incorporated by reference herein in its entirety. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

The pattern matching algorithm can be used to create a computer model reflecting the predicted chances of an optimal interaction for each agent and caller matching. For example, the computer model may include the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, exemplary methods and systems can match every available agent with every available caller, or even a narrower subset of agents or callers. The computer model can also be further refined to comprise a suitability score for each matching of an agent and a caller.

In other examples, exemplary models or methods may utilize affinity data associated with callers and/or agents. For example, affinity data may relate to an individual caller's contact outcomes (referred to in this application as "caller affinity data"), independent of their demographic, psychographic, or other business-relevant information. Such caller affinity data can include the caller's purchase history, contact time history, or customer satisfaction history. These histories can be general, such as the caller's general history for purchasing products, average contact time with an agent, or average customer satisfaction ratings. These histories can also be agent specific, such as the caller's purchase, contact time, or customer satisfaction history when connected to a particular agent.

As an example, a certain caller may be identified by their caller affinity data as one highly likely to make a purchase, because in the last several instances in which the caller was contacted, the caller elected to purchase a product or service. This purchase history can then be used to appropriately refine matches such that the caller is preferentially matched with an agent deemed suitable for the caller to increase the chances of an optimal interaction. Using this embodiment, a contact center could preferentially match the caller with an agent who does not have a high grade for generating revenue or who would not otherwise be an acceptable match, because the chance of a sale is still likely given the caller's past purchase behavior. This strategy for matching would leave available other agents who could have otherwise been occupied with a contact interaction with the caller. Alternatively, the contact center may instead seek to guarantee that the caller is matched with an agent with a high grade for generating revenue; irrespective of what the matches generated using caller data and agent demographic or psychographic data may indicate.

In one example, affinity data and an affinity database developed by the described examples may be one in which a caller's contact outcomes are tracked across the various agent data. Such an analysis might indicate, for example, that the caller is most likely to be satisfied with a contact if they are matched to an agent of similar gender, race, age, or even with a specific agent. Using this example, the method could preferentially match a caller with a specific agent or type of agent that is known from the caller affinity data to have generated an acceptable optimal interaction.

Affinity databases can provide particularly actionable information about a caller when commercial, client, or publicly-available database sources may lack information about the caller. This database development can also be used to further enhance contact routing and agent-to-caller matching even in the event that there is available data on the caller, as it may drive the conclusion that the individual caller's contact outcomes may vary from what the commercial databases might imply As an example, if an exemplary method was to rely solely on commercial databases in order to match a caller and agent, it may predict that the caller would be best matched to an agent of the same gender to achieve optimal customer satisfaction. However, by including affinity database information developed from prior interactions with the caller, an exemplary method might more accurately predict that the caller would be best matched to an agent of the opposite gender to achieve optimal customer satisfaction.

Callers can then be matched to agents at 810 based on a comparison of relative rankings determined in 806 and the pattern matching algorithm at 808. For instance, outcomes of both processes may be combined, e.g., via a linear or non-linear combination, to determine the best matching caller-agent pair.

The selection or mapping of a caller to an agent may then be passed to a routing engine or router for causing the caller to be routed to the agent at 812. The routing engine or router may be local or remote to a system that maps the caller to the agent. It is noted that additional actions may be performed, the described actions do not need to occur in the order in which they are stated, and some acts may be performed in parallel.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 9:
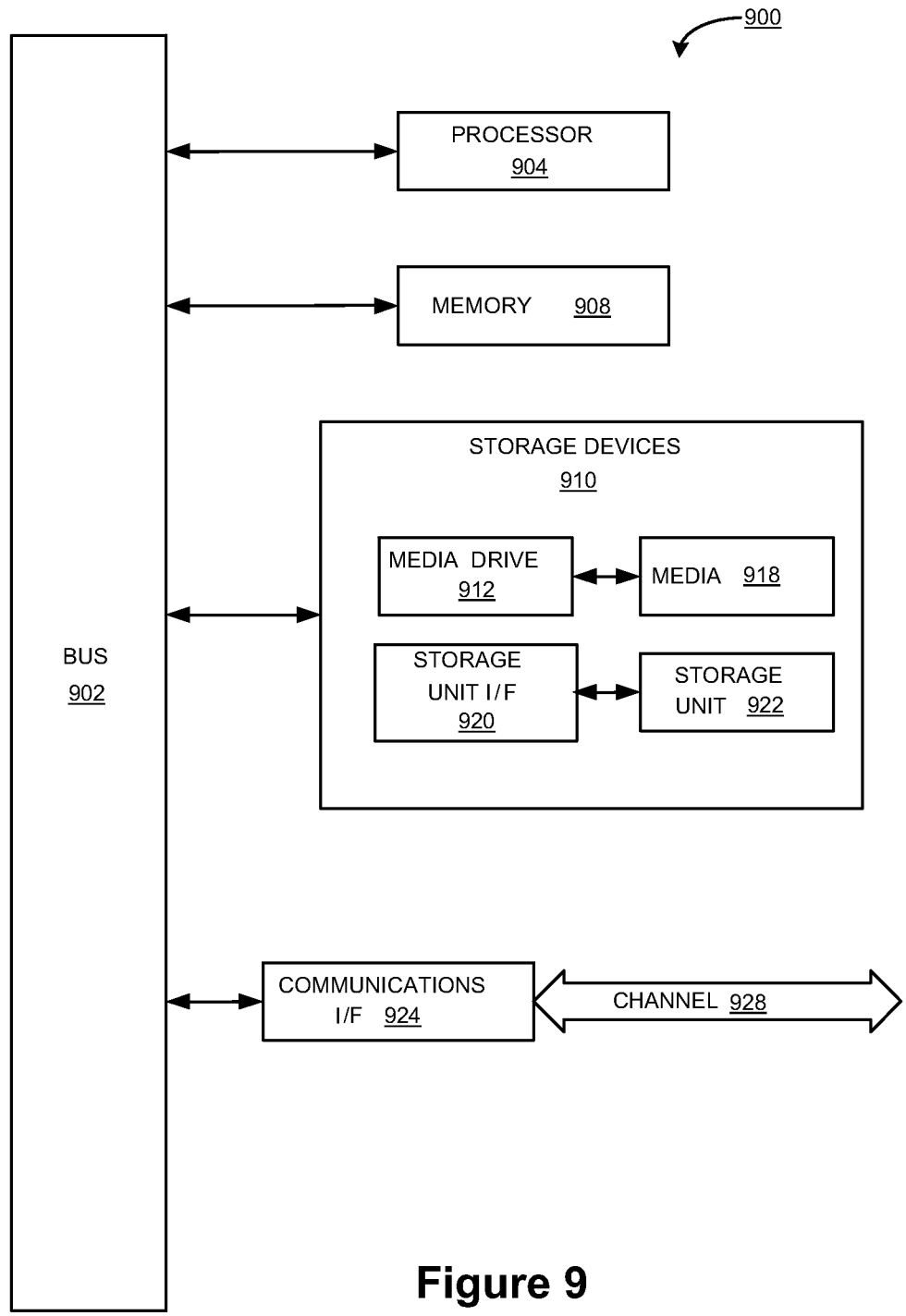
FIG. 9 illustrates a typical computing system that may be employed to implement some or all processing functionality in certain embodiments of the invention.

FIG. 9 illustrates a typical computing system 900 that may be employed to implement processing functionality in the various embodiments described herein. Computing systems of this type may be used in clients and servers, for example. Those skilled in the relevant art will also recognize how to implement the various embodiments using other computer systems or architectures. Computing system 900 may represent, for example, a desktop, laptop or notebook computer, hand-held computing device (PDA, cell phone, palmtop, etc), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 may carry signals and may be implemented using a wireless medium, wire or cable, fiber optics, or other communications medium Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 908, storage media 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of the various embodiments described herein. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage media 918, drive 912 or communications interface 924. The control logic (in this example, software instructions or computer program code), when executed by the processor 904, causes the processor 904 to perform the functions of the various embodiments as described herein.

It will be appreciated that, for clarity purposes, the above description has described embodiments with reference to different functional units and processors. However, it will be apparent that any suitable distribution of functionality between different functional units, processors or domains may be used without detracting from the various embodiments. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the various embodiments are merely meant to be illustrative and not limiting. Various changes and modifications may be made without departing from the various embodiments in their broader aspects. The appended claims encompass such changes and modifications within the spirit and scope of the various embodiments.

We claim:

1. A computer-implemented method for routing callers to agents in a call-center routing environment, the method comprising:
   determining, by one or more computers, a respective estimated call handle time for each caller of a set of callers based at least in part on demographic data of the respective caller;

grouping, by the one or more computers, the set of callers into two or more subgroups comprising one handle time subgroup and a lower handle time subgroup relative to the one handle time subgroup based at least in part on the respective estimated handle times for the respective callers;

obtaining, by the one or more computers, a respective ranking or score for a given outcome variable for each agent of a set of agents;

grouping, by the one or more computers, the set of agents into two or more subgroups comprising one ranking or score subgroup and a lower ranking or score subgroup relative to the one ranking or score subgroup based at least in part on the respective rankings or scores for the respective agents; and matching, by the one or more computers, the respective callers in the one handle time subgroup to respective of the agents in the lower ranking or score subgroup, and the respective callers in the lower handle time subgroup to respective of the agents in the one ranking or score subgroup.

2. The computer-implemented method of claim 1, wherein the given outcome variable is associated with a sales rate.

3. The computer-implemented method of claim 1, wherein the given outcome variable is an estimated call handle time for the agent.

4. The computer-implemented method of claim 1, further comprising comparing, by the one or more computers, demographic data of the set of agents to demographic data of the set of callers via a pattern matching algorithm to determine the chance of a positive result for at least the given outcome variable, wherein matching the callers to the agents is further based on results of the comparison.

5. The computer-implemented method of claim 1, wherein the estimated call handle time for a caller is determined based at least in part on the age of the caller.

6. A non-transitory computer readable storage medium comprising computer-readable instructions for matching, when executed by one or more computers, callers to agents in a call-center routing environment based on estimated call handle time, the computer readable instructions comprising:

determining, by the one or more computers, a respective estimated call handle time for each caller of a set of callers based at least in part on demographic data of the respective caller;

grouping, by the one or more computers, the set of callers into two or more subgroups comprising one handle time subgroup and a lower handle time subgroup relative to the one handle time subgroup based at least in part on the respective estimated handle times for the respective callers;

obtaining, by the one or more computers, a respective ranking or score for a given outcome variable for each agent of a set of agents;

grouping, by the one or more computers, the set of agents into two or more subgroups comprising one ranking or score subgroup and a lower ranking or score subgroup relative to the one ranking or score subgroup based at least in part on the respective rankings or scores for the respective agents; and matching, by the one or more computers, the respective callers in the one handle time subgroup to respective of the agents in the lower ranking or score subgroup, and the respective callers in the lower handle time subgroup to respective of the agents in the one ranking or score subgroup.

7. The computer readable storage medium of claim 6, wherein the given outcome variable is associated with a sales rate.

8. The computer readable storage medium of claim 6, wherein the given outcome variable is an estimated call handle time for the agent.

9. The computer readable storage medium of claim 6, further comprising program code for comparing demographic data of the set of agents to demographic data of the set of callers via a pattern matching algorithm to determine the chance of a positive result for at least the given outcome variable, wherein matching the callers to the agents is further based on results of the comparison.

10. The computer readable storage medium of claim 6, wherein the estimated call handle time for a caller is determined based at least in part on the age of the caller.

11. A system for routing callers to agents in a call center routing environment based on estimated call handle time, the apparatus comprising:

one or more computers configured with computer-readable program code to perform, when executed, the steps:

determining, by one or more computers, a respective estimated call handle time for each caller of a set of callers based at least in part on demographic data of the respective caller;

grouping, by the one or more computers, the set of callers into two or more subgroups comprising one handle time subgroup and a lower handle time subgroup relative to the one handle time subgroup based at least in part on the respective estimated handle times for the respective callers;

obtaining, by the one or more computers, a respective ranking or score for a given outcome variable for each agent of a set of agents;

grouping, by the one or more computers, the set of agents into two or more subgroups comprising one ranking or score subgroup and a lower ranking or score subgroup relative to the one ranking or score subgroup based at least in part on the respective rankings or scores for the respective agents; and matching, by the one or more computers, the respective callers in the one handle time subgroup to respective of the agents in the lower ranking or score subgroup, and the respective callers in the lower handle time subgroup to respective of the agents in the one ranking or score subgroup.

12. The system of claim 11, wherein the given outcome variable is associated with a sales rate.

13. The system of claim 11, wherein the one or more computers are further configured with program code, to perform, when executed, the step of determining an estimated call handle time for the agent, wherein matching the caller to the agent of the set of agents is further based on the estimated call handle time for the agent.

14. The system of claim 11, wherein the one or more computers are further configured with program code, to perform, when executed, the step of comparing demographic data of the set of agents to demographic data of the set of callers via a pattern matching algorithm to determine the chance of a positive result for at least the given outcome variable, wherein matching the callers to the agents is further based on results of the comparison.

15. The system of claim 11, wherein the estimated call handle time for a caller is determined based at least in part on the age of the caller.

* * * * *